United States Patent
Moonjelly et al.

(10) Patent No.: US 9,435,310 B2
(45) Date of Patent: Sep. 6, 2016

(54) HYDRAULIC START-OF-INJECTION DETECTING SYSTEM AND METHOD

(71) Applicant: CUMMINS INC., Columbus, IN (US)

(72) Inventors: Paul V. Moonjelly, Columbus, IN (US); Richard A. Booth, Columbus, IN (US); Jesus Carmona-Valdes, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 520 days.

(21) Appl. No.: 13/789,502

(22) Filed: Mar. 7, 2013

(65) Prior Publication Data

US 2014/0251272 A1 Sep. 11, 2014

(51) Int. Cl.
*F02M 65/00* (2006.01)
*F02D 41/40* (2006.01)
*F02D 35/02* (2006.01)
*F02D 41/28* (2006.01)

(52) U.S. Cl.
CPC ............ *F02M 65/00* (2013.01); *F02D 35/023* (2013.01); *F02D 35/028* (2013.01); *F02D 41/401* (2013.01); *F02D 2041/286* (2013.01); *F02D 2041/288* (2013.01); *F02D 2250/14* (2013.01); *F02M 65/005* (2013.01); *Y02T 10/44* (2013.01)

(58) Field of Classification Search
CPC .. F02D 41/401; F02D 35/023; F02D 35/028; F02D 2250/14; F02D 2041/001; F02D 41/0002; F02D 41/2467; F02D 41/0025; F02D 41/042; F02D 41/062; F02D 41/064; F02D 41/222; F02D 41/266; F02D 41/2422; F02D 41/26; F02D 2041/389; F02D 35/02; Y02T 10/44; F02M 65/005; B60W 10/06; G01M 15/11; G01L 23/225; F02B 2075/125
See application file for complete search history.

(56) References Cited

U.S. PATENT DOCUMENTS

| 5,129,379 | A | * | 7/1992 | Kaneyasu | F02D 37/02 123/436 |
|---|---|---|---|---|---|
| 5,533,492 | A | * | 7/1996 | Willey et al. | 123/681 |
| 5,767,396 | A | * | 6/1998 | Okamoto et al. | 73/114.49 |
| 6,085,727 | A | * | 7/2000 | Nakano | F02D 41/1401 123/447 |
| 6,840,218 | B2 | * | 1/2005 | Scholl et al. | 123/435 |
| 6,850,836 | B1 | * | 2/2005 | Scholl | G01M 15/12 701/115 |
| 2003/0106531 | A1 | * | 6/2003 | Saeki et al. | 123/435 |
| 2003/0106534 | A1 | * | 6/2003 | Wilson et al. | 123/456 |
| 2005/0051136 | A1 | | 3/2005 | Malaczynski et al. | |
| 2008/0103675 | A1 | * | 5/2008 | Ishizuka et al. | 701/103 |
| 2009/0084348 | A1 | * | 4/2009 | Batenburg et al. | 123/294 |

(Continued)

FOREIGN PATENT DOCUMENTS

GB 2331153 A * 5/1999 ............. F02B 77/08

*Primary Examiner* — Hung Q Nguyen
*Assistant Examiner* — Brian P Monahon
(74) *Attorney, Agent, or Firm* — Faegre Baker Daniels LLP (57) ABSTRACT

This disclosure provides system and method that can determine hydraulic start of injection (SOI) in engines using an in-cylinder pressure sensor. The system and method iteratively perform a wavelet transform on a signal based on the pressure information provided by the in-cylinder pressure sensors to determine a detail coefficient corresponding to a frequency band containing frequencies of pressure pulsations excited from a fuel jet injected into the cylinder. Hydraulic SOI is determined at the timing when the amplitude of the determined detail coefficient satisfies a predetermined threshold. The system and method provide diagnostic, control, and/or compensation opportunities for fuel injector operation in high pressure fuel rail engine systems without use of expensive or complex fuel injector components.

27 Claims, 8 Drawing Sheets

(56) References Cited

U.S. PATENT DOCUMENTS

2009/0312931 A1* 12/2009 Wang .................... F02D 35/023
                                                          701/102
2010/0248062 A1*  9/2010 Ishikawa ........... H01M 8/04328
                                                          429/444
2011/0030665 A1*  2/2011 Protin ................. F02D 41/0042
                                                          123/704
2011/0224888 A1*  9/2011 Girotto ................ F02D 41/123
                                                          701/103
2012/0216777 A1*  8/2012 Moonjelly .......... F02D 41/0085
                                                          123/435

* cited by examiner

FIG.8

HYDRAULIC START-OF-INJECTION DETECTING SYSTEM AND METHOD

TECHNICAL FIELD

The technical field relates to a system and method for detecting hydraulic start-of-injection (SOI) in an internal combustion engine.

BACKGROUND

Engine systems including a high pressure fuel delivery system utilize a common rail (also known as a high pressure fuel rail, common rail, or accumulator) to accumulate and distribute fuel to fuel injectors at high-pressure while minimizing pressure fluctuations among the injectors. These systems allow for precise control of high-pressure injection of fuel by an engine control module (ECM) or an engine control unit (ECU) into the cylinders of an internal combustion engine at timing that is independent from the engine speed. The ECM/ECU receives an engine speed signal from a sensor and then, using its algorithms and look-up calibration tables stored in the ECM/ECU, controls the amount of injected fuel and the timing of injection, called "start of injection" (SOI), through electric or hydraulic actuators to maintain engine speed. Controlling the timing of the SOI of fuel into an engine cylinder is needed to control emissions and fuel economy of the engine system.

The timing of SOI is controlled electronically in most of today's modern engines. Advancing the SOI (i.e., injecting fuel when the piston is further away from top dead center (TDC)) results in higher in-cylinder pressure, temperature, and efficiency, but at the cost of higher emissions of nitrogen oxides (NOx) due to the higher temperatures. Retarding the SOI can causes incomplete combustion and result in higher particulate matter (PM) and unburned hydrocarbon (HC) emissions. The delay time from the point of a commanded (electric) SOI and hydraulic (actual) SOI is useful information for controlling performance, economy and emissions of such engine systems.

SUMMARY

This disclosure provides system and method that can determine hydraulic start of injection (SOI) in engines using an in-cylinder pressure sensor. The system and method performs a wavelet transform on a signal based on the sampled pressure information provided by the in-cylinder pressure sensors, and the wavelet transformed signal is analyzed to determine actual hydraulic SOI. The system and method provide diagnostic, control and/or compensation opportunities for fuel injector operation in high pressure fuel rail engine systems.

In one aspect, a method detects, for each fuel injector fluidly connected to a cylinder of an internal combustion engine, hydraulic SOI timing of the fuel injector following a commanded SOI. The method includes sampling pressure in a combustion chamber of the cylinder over a time period including electrical SOI and electrical end of injection (EOI) for a single SOI event to obtain a signal based on the sampled pressure. Using a processor, a wavelet transform of the sampled signal is calculated to determine a frequency band of pressure pulsations excited from a fuel jet injected into the cylinder during the time period, and a time of hydraulic SOI timing of the fuel injector is determined as a time when an amplitude value of the wavelet transformed signal in the frequency band satisfies a predetermined threshold value.

In another aspect of the disclosure, an engine system is configured to determine hydraulic SOI timing of fuel injectors utilized in the fuel system of the engine system. The engine system includes an internal combustion engine including an engine block having plural cylinders and respective pistons and a cylinder head covering the cylinders to define a combustion chamber between the top of the piston and a surface of the cylinder head. Each of the combustion chambers is fluidly connected to a fuel injector configured to inject fuel into the combustion chamber in a timed manner and pressure sensor configured to sense a pressure in the combustion chamber and generate a signal indicative of the sensed pressure. A crankshaft is coupled to each piston and configured to cause each piston to move in a reciprocal motion by angular rotation thereof. The engine system includes a controller having a pressure determining module configured to receive the signal indicative of pressure in each of the combustion chambers as a function of crankshaft angle, a wavelet transform determining module configured to calculate, for each cylinder, a wavelet transform of the sampled pressure signal to determine a frequency band containing frequencies of pressure pulsations excited from a fuel jet injected into the cylinder. A comparing module is configured to compare amplitudes of the transformed signal in the frequency band with a predetermined threshold value and determine hydraulic SOI timing of the fuel injector as corresponding to the crankshaft timing when the amplitude value first satisfies the threshold value.

DETAILED DESCRIPTION

Embodiments described herein are directed to a system and method of detecting hydraulic start-of-injection (SOI) on internal combustion engines equipped with in-cylinder pressure sensors. Various aspects are described hereafter in connection with exemplary embodiments to facilitate an understanding of the disclosure. However, the disclosure is not limited to these embodiments. Descriptions and depictions of well-known functions and constructions may not be provided for clarity and conciseness.

The inventors realized that hydraulic SOI timing relative to commanded (electrical) SOI timing is generally not known during normal engine operation unless a custom instrumented injector is used, such as an injector including a lift sensor. Information about hydraulic SOI can be an indicator of injector health, which can influence fueling accuracy, especially at low fueling levels. Also, drift in the hydraulic SOI can adversely affect combustion phasing.

The system and method disclosed herein can determine hydraulic SOI timing without the need for specialized needle lift fuel injectors by utilizing an in-cylinder pressure sensor and wavelet analysis of the sensed pressure. The hydraulic SOI information thus determined can then be used for diagnostic evaluation and feedback control/compensation opportunities in a high pressure common rail fuel system. For example, SOI information obtained from the disclosed method and system can be used to populate SOI delay tables in controls software using on-engine data.

The cylinder pressure signal is provided by a cylinder pressure sensor (CPS), or in-cylinder pressure sensor (e.g., a pressure sensor integrated with a glow plug and provided adjacent to the fuel injector) and is sampled at a very high speed for a brief duration starting shortly before the electrical SOI and ending shortly after the electrical end-of-injection (EOI). The sampling rate is selected such that it ensures a desired output resolution. The resulting discretized CPS signal is processed with a wavelet transform (WT), for example, a discrete wavelet transform (DWT), stationary wavelet transform (SWT), or continuous wavelet transform (CWT), which is tailored to bring out a certain band of frequencies corresponding to the high frequency pressure pulsations inside the cylinder caused by injected fuel. The in-cylinder pressure sensor picks up the pulsations due to the high velocity fuel jet passing in front of the sensor, and the onset of this phenomenon lines up with the hydraulic SOI event in time as the fuel starts squirting into the combustion chamber of the cylinder.

In an embodiment, a DWT is performed on the discretized CPS signal to calculate the detail coefficients corresponding to a specified scale. The scale can be specified by analyzing engine-test data such that it corresponds to a certain frequency band where most of the activity due to injection pulsations takes place. That certain frequency, or target frequency band, is a function of cylinder geometry and hence can be different across different engine types. The DWT can be performed in an iterative fashion on dyadic (powers of 2) scales until the desired detail coefficients are extracted. The number of iterations can be fixed for a given engine with specified cylinder geometry. The detail signal at the desired level (extracted by successive transform iterations) is analyzed to locate the sudden rise in signal energy corresponding to the pressure pulsations mentioned above.

In another embodiment, a CWT can be utilized as a filtering technique to extract a frequency band for determining hydraulic SOI timing of the fuel injector. A CWT of a signal x(t) is defined as:

$$CWT_t^{\psi}(\tau, s) = \Psi_t^{\psi}(\tau, s) = \frac{1}{\sqrt{|s|}} \int_{-\infty}^{\infty} x(t) \psi^*\left(\frac{t-\tau}{s}\right) dt,$$

where the analyzing function is the wavelet, $\psi$, * denotes the complex conjugate, and $\tau$ and s are position and scale parameters, respectively. As can be seen, scaling either dilates a signal (larger s values) or compresses a signal (smaller s values), and $\tau$ translates, or shifts the wavelet $\psi^*$ to a time position along the signal x(t). A difference between the CWT and DWT is that CWT can use continuous scales rather than dyadic scales or levels. Here scale is inversely proportional to frequency and a specific scale corresponds to a certain frequency band for a chosen wavelet type. That is, low scales correspond to high frequencies and high scales correspond to low frequencies. A CWT can directly calculate the transformed signal for a certain chosen scale without having to proceed iteratively through the details and approximations at multiple levels. In any of the CWT, DWT and SWT cases, frequency bands of interest can be extracted from the CPS signal.

Figure 1:
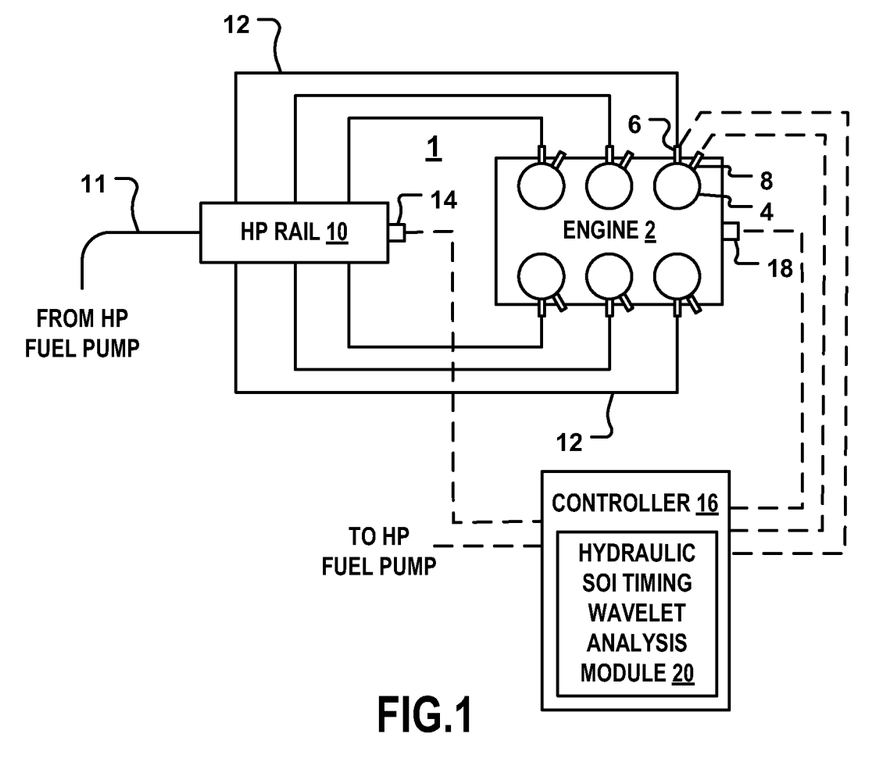
FIG. 1 is a diagram of an engine system including a hydraulic SOI timing wavelet analysis module according to an exemplary embodiment.

FIG. 1 is a diagram of an engine system 1 including a hydraulic SOI timing detection system utilizing wavelet analysis according to an exemplary embodiment. As shown in FIG. 1, engine system 1 includes an internal combustion engine 2 including an engine block having plural cylinders 4, each having a respective piston (not shown). The cylinders of the engine block are covered and sealed with a cylinder head (not shown) having a surface that, together with the cylinder sidewalls, defines a combustion chamber of the cylinder 4. The cylinder head of the engine 2 includes a fuel injector 6 configured to inject an atomized fuel spray into the cylinder 4 combustion chamber at a determined timing corresponding to a position of the engine crankshaft (not shown) and duration corresponding to fueling quantity. The combustion chamber includes a pressure sensor 8 (i.e., the CPS) that fluidly communicates with the combustion chamber and is configured to sense pressure in the combustion chamber and generate a signal indicative of that pressure. For purposes of clarity in the illustrated engine system 1 of FIG. 1, only one of the plural cylinders 4, fuel injectors 6, and cylinder pressure sensor 8 include reference labels.

The fuel system of engine system 1 includes a high pressure (HP) rail 10 fluidly connected downstream to a HP pump (not shown) via high pressure fuel line 11. The HP rail 10 is fluidly connected to each fuel injector 6 via a high pressure fuel lines 12, and is provided with a rail pressure sensor 14 configured to generate a signal indicative of the pressure of fuel in the HP rail 10 (i.e., rail pressure). A crankshaft angle sensor 16 is provided with the engine 2 and is configured to sense the angular position of the crankshaft and generate a signal indicative of that sensed angular position. Each of the signals generated by the combustion chamber pressure sensors 8, the rail pressure sensor 14, and the crankshaft angle sensor 16 are communicated to a controller 16, which includes a processor, for example, a microprocessor that is configured to processes the received signals.

As shown in FIG. 1, the controller 16 includes a hydraulic SOI timing wavelet analysis module 20 configured to determine SOI for each of the fuel injectors 6 in a manner described hereafter. While not shown in FIG. 1, the engine system 1 can include an air handling system including an energy conversion device, such as a turbocharger (e.g., variable geometry turbocharger), an intake manifold, and exhaust gas recirculation (EGR) system, an exhaust system including an exhaust manifold and exhaust aftertreatment system for controlling emissions, and other devices and systems.

The controller 16 can be an ECU/ECM that controls various elements of the engine system 1 including the timing duration and phasing of the fuel injectors 6, or another controller. While not shown, controller 16 can be communicatively connected with other components of the engine system, such as the HP fuel pump, an EGR system (not shown), and an exhaust aftertreatment system (not shown) in a known manner to monitor and control various engine system functions. Further, many aspects of this disclosure are described in terms of sequences of actions to be performed by elements of the hydraulic SOI timing wavelet analysis module 20 of controller 16, which can be embodied in a controller of an engine system, such as the ECM/ECU, or in a controller separate from, and communicating with an ECU/ECM and/or another network system, other computer system, or other hardware capable of executing programmed instructions. In an embodiment, the controller 16 is an ECM that is part of a CAN (controller area network) in which the controller 16, sensors, actuators of the engine system 1 communicate via digital CAN messages.

The hydraulic SOI timing wavelet analysis module 20 utilizes a wavelet transform (WT), which provides location in dimensions of time and frequency for the analyzed CPS signal, which is sometimes denoted herein as CPS[n] because it is a discrete time sequence including N elements, where n=0, 1, . . . N−1.

In the present embodiment, a DWT is utilized to analyze the CPS signal CPS[n]. The DWT analyzes the CPS signal at different frequency bands with different resolutions by decomposing the CPS signal into approximation information and detail information. The DWT utilizes two sets of functions: scaling functions and wavelet functions, which are associated with respective low-pass filters and high-pass filters. Decomposition of the CPS signal into different frequency bands is carried out by successive high- and low-pass filtering of the signal.

Figures 2A, 2B:
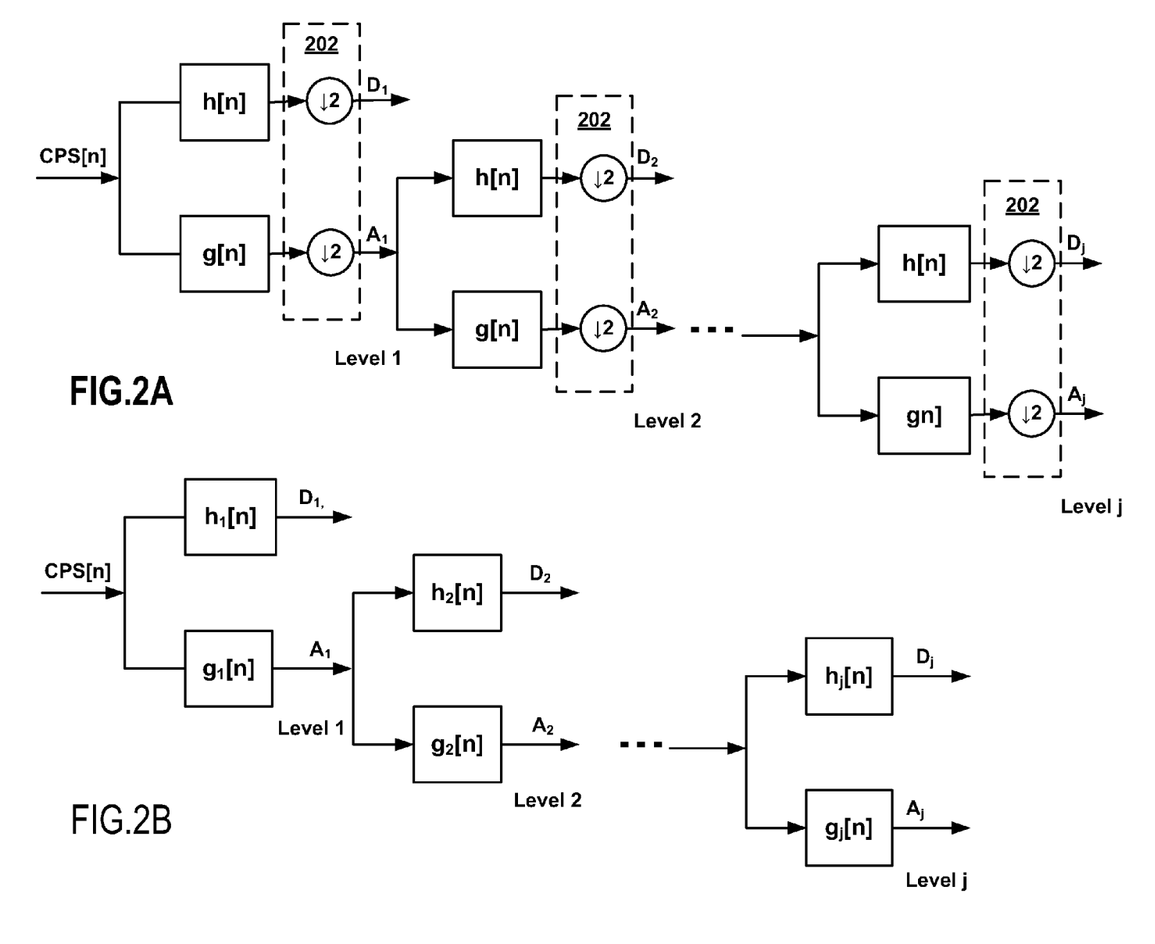
FIG. 2A is a diagram showing computation of the discrete wavelet transform of a sampled cylinder pressure sensor signal according to an exemplary embodiment.
FIG. 2B is a diagram showing computation of the stationary wavelet transform of a sampled cylinder pressure sensor signal according to an exemplary embodiment.

FIG. 2A shows an exemplary computation of the DWT of signal CPS[n] using a j-level filter bank. It is to be appreciated that the filter bank can be expanded or decreased in level size to achieve an acceptable, desired, or required resolution. Each of filters h[n] is a standard high-pass wavelet filter and each of filters g[n] is a standard low-pass wavelet filter. As shown in FIG. 2A, the signal CPS[n] is first passed through half-band high-pass filter h[n] and a half-band low-pass filter g[n]. Because the signal output from filter g[n] halves the highest frequency, Nyquist's rule allows for removing half the samples. In view of this, a downsampler 202 is used to remove every other sample of the filter output, which results in level 1 approximation coefficient $A_1$ having a doubled frequency resolution and halved time resolution relative to the signal CPS[n]. At the next level, level 2, the filter output of the high-pass filter h[n] and the low-pass filter g[n] at that level double the time resolution and decrease the frequency content, and thus increase the window of the wavelet filter. From level 2 on, the output of the high-pass filter h[n] represents the highest half of the frequency content of the low-pass filter of the previous level, and thus results in a pass-band. Hence, the sequence of low-pass filtering, downsampling, and high-pass filtering act together as a band-pass filter. For k=1, 2, . . . , j, at each level k the signal output from the high-pass filter h[n] and the downsampler 202 is called the detail coefficient $D_k$ and provide the detail information of the signal CPS[n], and the signal output from the low-pass filter is called the approximation coefficient $A_k$ and provide a more coarse approximation of the signal content. The wavelet coefficients $A_k$ and $D_k$ represent the content of CPS[n] at various frequency bands.

In another exemplary embodiment, an SWT is used to analyze the signal CPS[n]. The SWT, also known as the "undecimated wavelet transform," "the invariant wavelet transform," and "the redundant wavelet transform," provides efficient numerical solutions in processing the pressure signal. The SWT algorithm is close to the DWT in that at each level high- and low-pass filters are applied to (i.e., convolved with the impulse response of the filter) a sequence output from the previous level to produce two sequences a the next level, but the SWT differs from the DWT in that filtered data is not decimated (i.e., not downsampled) between levels. As a result, each new sequence output from each filter and providing to a succeeding filter has the same length as the sequence input to that filter. Additionally, wavelet filters at each level after the first level are modified versions of a filter at the previous level such that a filter at a specified level is an upsampled version of a filter in a level previous to the specified level. The upsampled versions can be created by zero padding the pervious filter, for example. The SWT can give a better approximation than the DWT because it is redundant, linear, and shift invariant.

FIG. 2B shows an embodiment of a computation of the SWT of signal CPS [n] using a j-level filter bank. For k=1, 2, . . . , j, each of filters $h_k[n]$ is a standard high-pass wavelet filter and each of filters $g_k[n]$ is a standard high-pass wavelet filter. Filter outputs of the high-pass filters $h_k[n]$ are the detail coefficients, $D_k$, and filter outputs of the low-pass filters are the approximation coefficients, $A_k$, of the SWT. Filters at each level are upsampled versions of respective previous filters by alternately padding out the previous filter with zeros.

While FIGS. 2A and 2B show computation of a discrete-type wavelet, other embodiments can utilize a continuous wavelet transform (CWT), which can be calculated, for example, using a digital signal processor (DSP). The CWT is redundant in both dimensions of scale and time, although at a relatively high computational burden.

Figure 3:
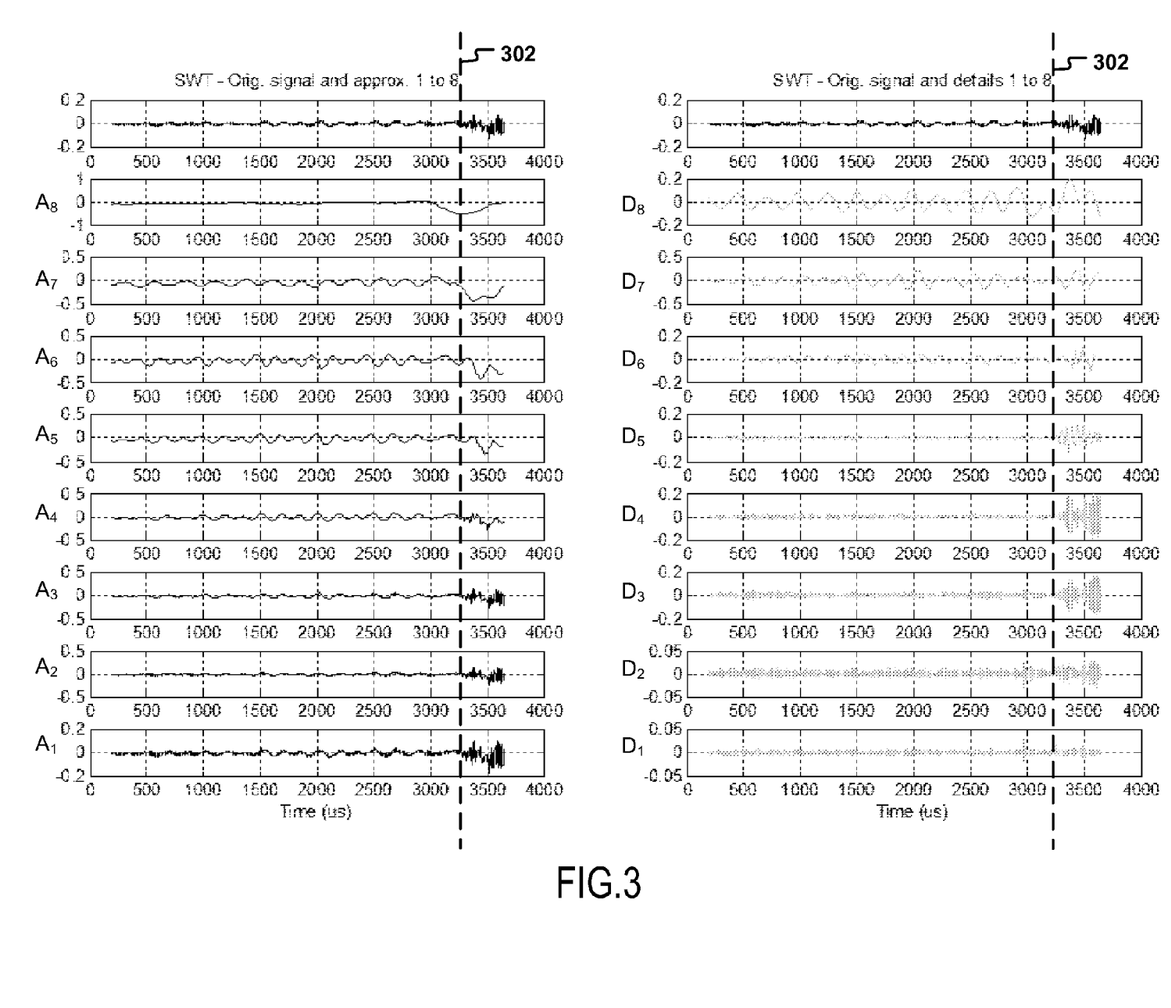
FIG. 3 shows a graph of a cylinder pressure signal and graphs of exemplary approximation and detail coefficients across different dyadic scales.

FIG. 3 shows an example analysis of a CPS signal utilizing an SWT showing approximation and detail coefficients across different dyadic scales. The rail pressure was 1600 bar, the engine speed 1500 RPM, the load 25%, and 0 degree electrical SOI. The graphs depicted in the left hand column show approximation coefficients $A_1$-$A_8$ and the graphs depicted in the right hand column show detail coefficients $D_1$-$D_8$ for different iterations of the wavelet transform. The original CPS signal, which is shown in a graph at the top of each column, was pre-filtered with a hardware band-pass filter in this example (to enhance the signal-to-noise ratio). For validation purposes, the fuel injector is equipped with a needle lift sensor to sense the actual hydraulic SOI event timing, which is marked by the vertical dashed lines 302 on both columns of plots. It can be observed that the levels corresponding to detail coefficients $D_3$, $D_4$, and $D_5$ show a significant change in behavior after the SOI event time 302. Additionally, approximation coefficients $A_7$ and $A_8$ show a momentary pressure drop after the SOI event 302 due to injection related cooling.

Figure 4:
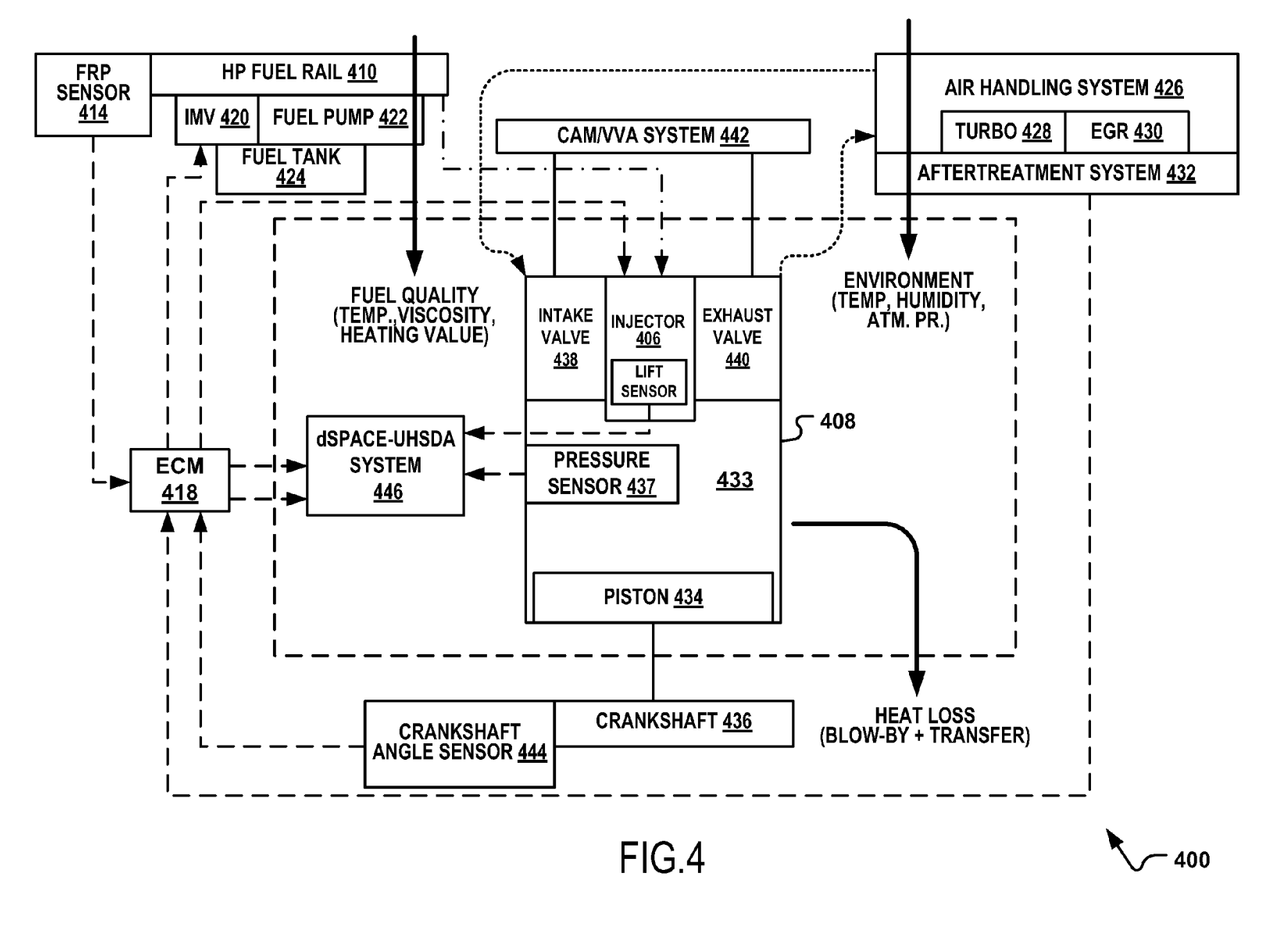
FIG. 4 is a block diagram of a test system used test to verify whether SOI detected from cylinder pressure data using wavelet analysis sufficiently matches with needle lift over a range of SOI commands. The test system shown in FIG. 4 used a needle lift injector strictly for reference and validation purposes.

FIG. 4 is a schematic diagram of a test system 400 used to collect data of a 4.5 L I-4 engine equipped with cylinder pressure sensors in all four cylinders for proof-of-concept testing to produce the CPS signal wavelet analysis data, such as shown in FIG. 3. The test system 400 used a Bosch CRIN 3.0 fuel system. The fuel system included a specially instrumented needle lift injector 406 installed in one cylinder 408 of the engine strictly for validation purposes, a high pressure fuel rail 410, a fuel rail pressure (FRP) sensor 414, an inlet metering valve (IMV) 420, a fuel pump 422, and a fuel tank 424. The sensors and actuators of the system are communicatively coupled to an ECM 418. The needle lift signal provided by the specially instrumented needle lift injector 406 served as an SOI reference in the proof-of-concept stage and this technique is meant to replace the need for such instrumentation once it is mature. The test system 400 also included an air handling system 426 having a turbocharger 428, an EGR system 430 and an exhaust aftertreatment system 432. The cylinder 408 includes a combustion chamber 433 above a piston 434 movable by crankshaft 436, a combustion chamber pressure sensor 437, and an intake valve 438 and exhaust valve 440 controlled by a cam/variable valve actuator (VVA) system 442. A crankshaft angle sensor 444 is provided to indicate the angular position of the crankshaft 436. Also in FIG. 4, solid lines between elements represent transfer of force and/or touching between elements, dashed lines represent power, signal and/or control signals lines, dotted lines represent air or exhaust gas flow, and the dashed-dot line represents fuel flow.

A dSPACE-UHSDA combination data acquisition system 446 was used to obtain the sampling throughput needed for this application, for example, from the combustion chamber pressure sensor 437 and lift sensor of fuel injector 406. The effects of external factors on this method are depicted in FIG. 4 with thick arrows. These effects were controlled by selecting favorable baseline operating conditions (e.g., no EGR, turbine bypass valve closed, VVA disabled, fuel rail pressure locked, only main pulse, constant speed and load etc.).

Figure 5:
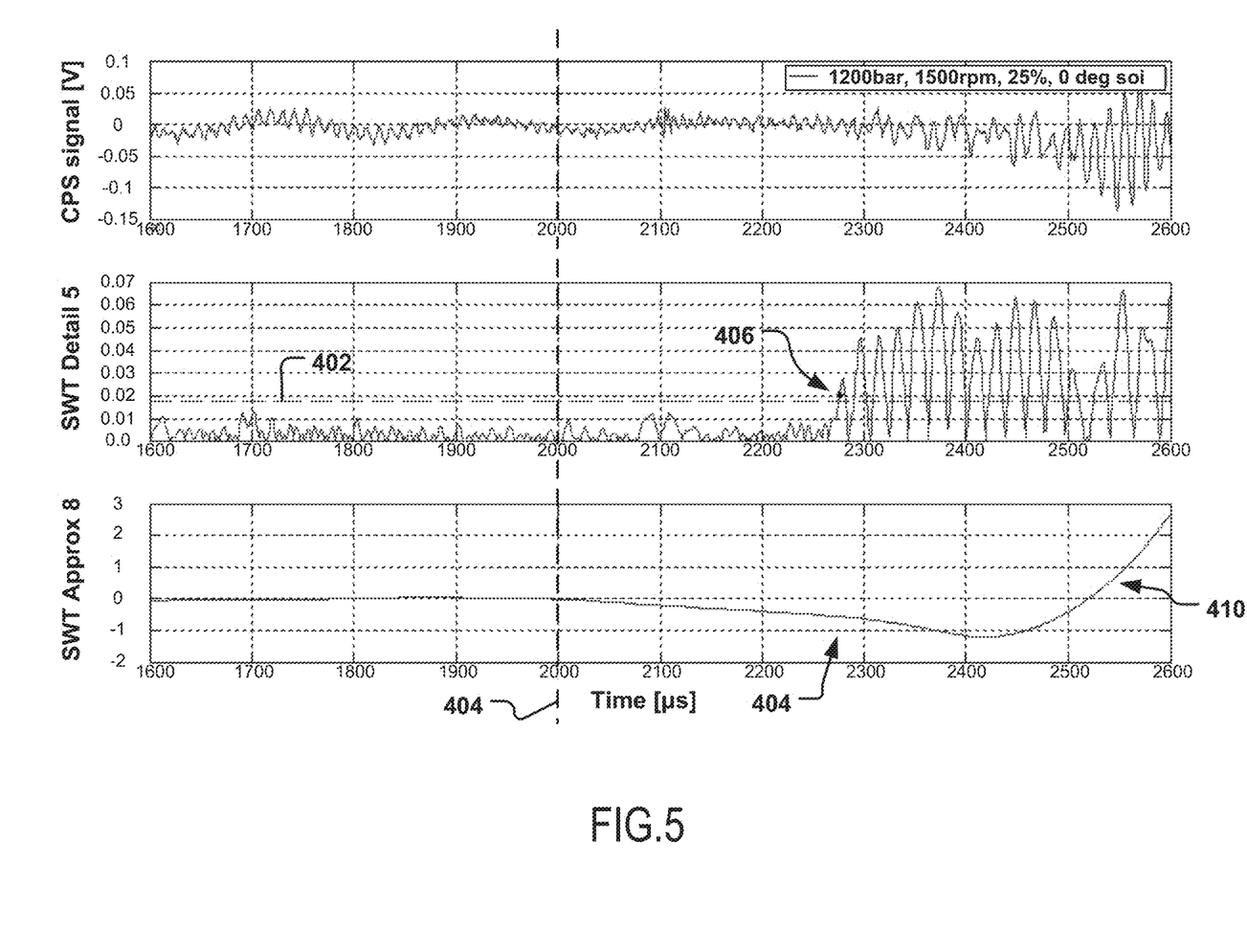
FIG. 5 shows graphs depicting a cylinder pressure signal and wavelet transform processing of the pressure signal to determine hydraulic SOI according to the test system of FIG. 4.

With reference to FIG. 5, a process of detecting hydraulic SOI using an SWT will now be described. The graphs of FIG. 5 correspond to one injection event at 1500 RPM, 25% load, 0 degree SOI, and 1200 bar rail pressure. Starting from the top, the first graph is the sampled CPS signal, the second graph directly below the CPS signal graph) is the level 5 detail approximation coefficient (i.e., $D_5$), and the third graph below the level 5 detail approximation coefficient is the level 8 approximation coefficient (i.e., $A_8$). In this embodiment, the detail coefficient used to determine hydraulic SOI, here the level 5 detail coefficient, corresponds to a frequency band containing frequencies of pressure pulsations excited from a fuel jet injected into the cylinder from the fuel injector. Selection of the detail coefficient used to determine hydraulic SOI is based on a function on the geometry of the cylinder combustion chamber and thus can be different across different engine types or configurations. Hydraulic SOI corresponds to the point where the wavelet transformed signal amplitude crosses a statistically significant value. In the present example, the threshold is set at a 4-sigma level, as shown by dashed line 402. If this type of threshold is applied, the signal standard deviation before an electrical SOI event, which is depicted in FIG. 4 as dashed line 404, should be used for the threshold as it is a good indicator of the noise floor (i.e., the threshold in this case would be equal to four times the signal standard deviation before the event). As shown in FIG. 5, the detail coefficient amplitude at the selected level (SWT level 5 in this case) crossing the 4-sigma line for the first time after electrical SOI event 404 marks the hydraulic SOI event as shown at point 406 in FIG. 5. To prevent false detection in the presence of noise, the pre-event mean signal amplitude and the post-event mean amplitude can be compared to check for a significant increase (e.g., several times), which further confirms a hydraulic SOI detection. (The transformed signal is expected to be relatively quiet in the band of interest before the hydraulic SOI event and should have a lot of activity after that point in time.)

The SWT level 8 approximation ($A_8$) plot in FIG. 5 verifies the detected hydraulic SOI, i.e., it is a validation of the approach in that the detected hydraulic SOI event lines up with the cooling from the vaporization of the injected fuel spray, which lowers the instantaneous pressure in the cooling pressure drop area 408 prior to the start of combustion event at 410. It is visible in both $A_7$ and $A_8$, but the $A_8$ coefficient visually lines up slightly better for illustration purposes.

While the present embodiment analyzes the D5 coefficient, any of the detail coefficients can be selected for detection of hydraulic SOI. A choice of a particular frequency band (corresponding to a level and detail coefficient) over another one can be determined based on desired performance and tradeoff considerations. For example, a choice of detail coefficient can be based on the following considerations: 1) looking at a broad range of data to identify the level (or scale) that gave the best signal-to-noise ratio in a repeatable/robust manner across operating conditions, and 2) the required detection accuracy for the application, since going higher in the detail level (or lower in scale) provides better time resolution, but at the expense of more computations.

The following strategy can be used in the choice of the wavelet. Because isolation of transient events in time is an objective of the application at hand, time alignment of wavelet coefficients (i.e. near zero phase shifts) is a property required of the wavelet. The chosen wavelet should also allow repeatable estimation of wavelet variance across scales with little or no leakage. Additionally, the chosen wavelet should be amenable to fast implementation on automotive ECM/ECUs. 'Symlet' and 'Coiflet' wavelet families are particularly good for zero phase shift applications, and are amenable for fast implementation. These wavelet families also had comparable variance properties with little leakage. Using the shortest widths would introduce noticeable artifacts like fins or triangles, whereas larger widths would better match characteristic features. However, because computational burden and boundary distortion effects increase (requiring more data before and after the event window to be processed) with width, one approach uses the smallest width wavelet giving acceptable results. For example, in an embodiment using SWT, both Symlet-4 and Coiflet-6 had comparable performance, but Symlet-4 was chosen as it was the shorter one of the two wavelets and met particular performance criteria.

Figure 6:
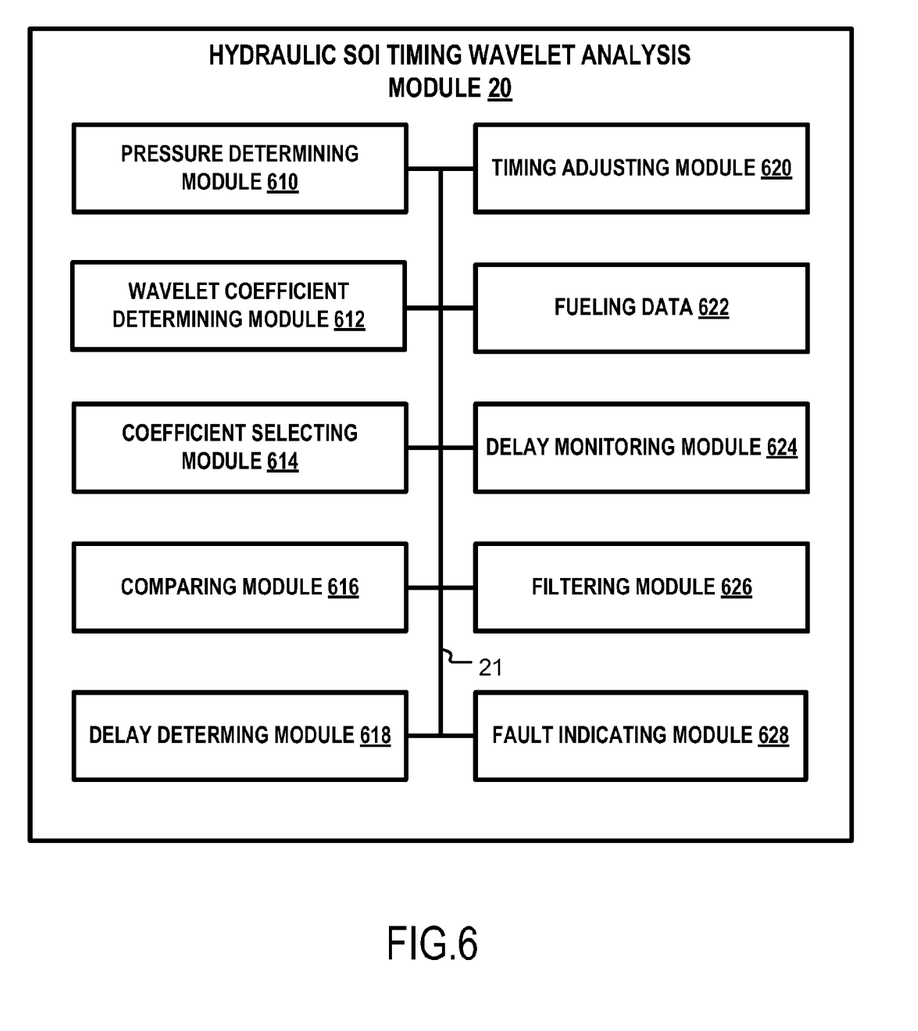
FIG. 6 is a diagram of logic submodules of a hydraulic SOI timing wavelet analysis module according to an exemplary embodiment.

FIG. 6 shows a more detailed diagram of the submodule logic of the hydraulic SOI timing wavelet analysis module 20 according to an exemplary embodiment. The component modules of the hydraulic SOI timing wavelet analysis module 20 communicate with components the controller 16 (e.g., ECU) (not shown) and/or one another via a network 21, which can be, for example, a controller area network (CAN) or another network. As shown in FIG. 6, for each cylinder and corresponding fuel injection, the hydraulic SOI timing wavelet analysis module 20 includes a pressure determining module 610 configured to receive signals provided by the combustion chamber pressure sensor 8 indicative of pressure in the cylinder combustion chamber as a function of crankshaft angle. The pressure determining module 610 samples pressure in the cylinder combustion chamber across a time period or sweep of crankshaft angle at a rate corresponding to a desired or required resolution. The sampled pressure values, and other parameters and characteristics determined by the hydraulic SOI timing wavelet analysis module 20, can be recorded into memory accessible by the hydraulic SOI timing wavelet analysis module 20 and/or by other modules of the engine system 1. A wavelet coefficient determining module 612 is configured to perform a wavelet transform on the sampled cylinder pressure data provided by the pressure determining module 610 and determine detail and approximation coefficients. The wavelet coefficient determining module 612 has access to plural high- and low-pass wavelet filters (not shown) corresponding to the type of filter bank for the wavelet transform being performed and the number of iterations of the wavelet transform performed. A coefficient selecting module 614, which may be a submodule of the wavelet determining module 612, is configured to determine a level of iterations performed by the wavelet coefficient determining module 612 based on the type of engine system 1, a cylinder geometry, or other pre-stored data accessible by the hydraulic SOI timing wavelet analysis module 20. The coefficient selecting module 614 determines a detailed coefficient corresponding to a frequency band containing frequencies of pressure pulsations excited from a fuel jet injected into the cylinder from the fuel injector. A comparing module 616 is configured to compare the amplitudes selected detail coefficient calculated by the wavelet coefficient determining module 612 with a threshold value and determine hydraulic SOI timing for the corresponding fuel injector as the crankshaft timing when the amplitude value satisfies the threshold value.

The embodiment shown in FIG. 6 has additional modules that can be included in the hydraulic SOI timing wavelet analysis module 20. A delay determining module 618 is configured to determine an amount of delay between the determined hydraulic SOI timing and a timing of the commanded SOI. A timing adjusting module 620 can be provided for adjusting a timing of the commanded SOI of the injector by an amount corresponding to the delay amount. The timing adjusting module is configured to adjust the timing of a command timing value output from a fueling mapping or table so the injector performs within an acceptable or optimal range. The adjustment can move the commanded (electrical) SOI in a direction (i.e., forward or backward in time or crankshaft angle) and magnitude based on the detected delay determined by the delay determining module to accommodate for detected delay outlying an acceptable range. The timing adjusting module 620 can act to reduce the injector-to-injector fueling variations by maintaining injector specific trims/corrections that evolve over time. The hydraulic SOI timing wavelet analysis module 20 includes fueling data 622, for example, fueling tables or maps (e.g., FON maps/tables) from which the timing adjustment module obtains a predetermined fueling command output for adjustment. The fueling maps can be obtained from, for example, memory of the controller 16 or from storage elsewhere in the system network 21 or from remote storage. While the embodiment of FIG. 6 shows fueling data 622 provided with the hydraulic SOI timing wavelet analysis module 20 (e.g., as part of the ECU), other embodiments can access fueling data from another module or storage accessible by the timing adjusting module 620.

The hydraulic SOI timing wavelet analysis module 20 can include a delay monitoring module 624 that is configured to monitor the delay amounts determined by the delay determining module 618 over time to detect drift in delay amounts satisfying a predetermined drift threshold value. For each fuel injector for which a detected delay amount drift satisfies the predetermined drift threshold value, the delay monitoring module 618 can include a delay adjustment module configured to adjust a timing of commanded SOI for that fuel injector to compensate for the detected drift amount. It is to be appreciated that the functions of some submodules of the hydraulic SOI timing wavelet analysis module 20 can be combined, such as the delay determining module 618 and the delay monitoring module 624 into a single module performing multiple functions.

The hydraulic SOI timing wavelet analysis module 20 can also include a filtering module 626 configured to process signals determined by modules in the hydraulic SOI timing wavelet analysis module 20. For example, the hydraulic SOI for a large number of fuel injection events can be detected, stored, and used in a moving average filter to suppress the effect of injection-to-injection measurement errors or other noise. In an embodiment, the filtering module 626 includes a moving average filter to process the individual hydraulic SOI delay values from module 618 to minimize shot-to-shot variability of the injection process. It is to be understood that the filtering processes performed by filtering module 626 can be performed by individual modules or by other modules of the hydraulic SOI timing wavelet analysis module 20, for example, a module calculating or determining data to be filtered.

The hydraulic SOI timing wavelet analysis module 20 can also include a fault indicating module 628 configured to detect abnormal or excessive drifts in hydraulic SOI delay by comparing a determined amount of delay or drift with a fault threshold, which can be a determination of whether a delay threshold value is exceeded or is an outlier of a range; and generate a fault indication, for example, a flag, code or alarm if the delay amount satisfies the fault threshold.

As part of proof-of-concept testing, commanded SOI was swept through a range of values around the Top Dead Center (TDC) while holding all other parameters at baseline values. The objective of the testing was to see how the hydraulic SOI detected from cylinder pressure data using the wavelet analysis method compares with the needle lift SOI (reference) over the range of SOI commands. The data from this test is plotted in FIG. 7. It can be seen from FIG. 7 that the wavelet-based hydraulic SOI delay 702, i.e., the difference between the electrical and hydraulic SOI event markers, always falls between the needle-lift based SOI delay 704 and the Cummins rate-shape based SOI delay 706. This can be explained from the physics of the setup where the needle lift sensor is upstream and the rate-shape pressure sensor is downstream of the injection nozzle. It can be argued that the wavelet-based SOI is a true indicator of when the fuel spray has developed inside the cylinder and can be better than the other two references (i.e., needle lift and rate-shape) for combustion phasing tuning efforts.

Figure 7:
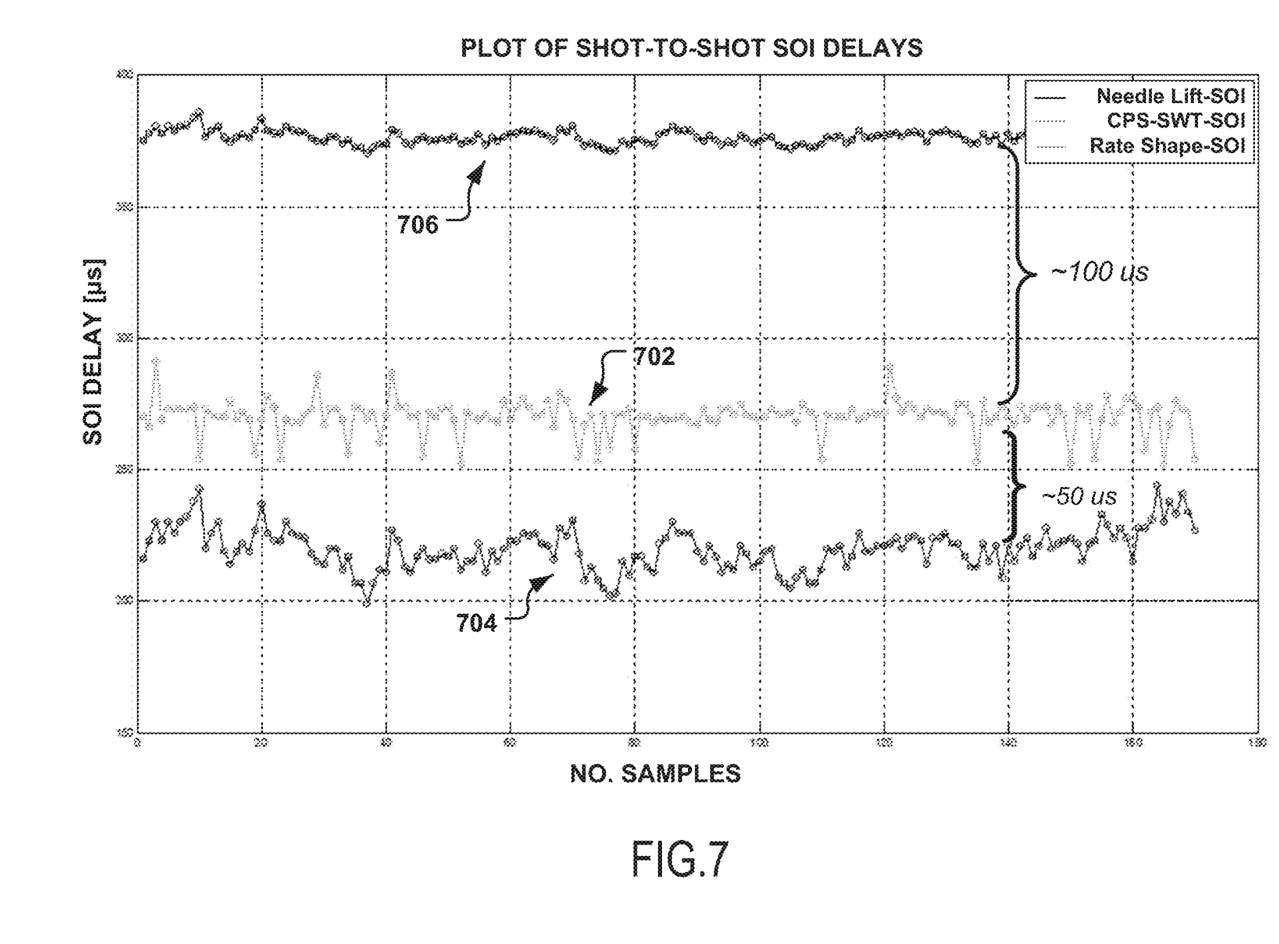
FIG. 7 is a scatter plot of needle lift SOI, wavelet-based hydraulic SOI delay, and the rate-shape based SOI delay showing a comparison of the hydraulic SOI detected from cylinder pressure data using the wavelet analysis method with the needle lift SOI and rate-shape based SOI over the range of SOI commands.
Figure 8:
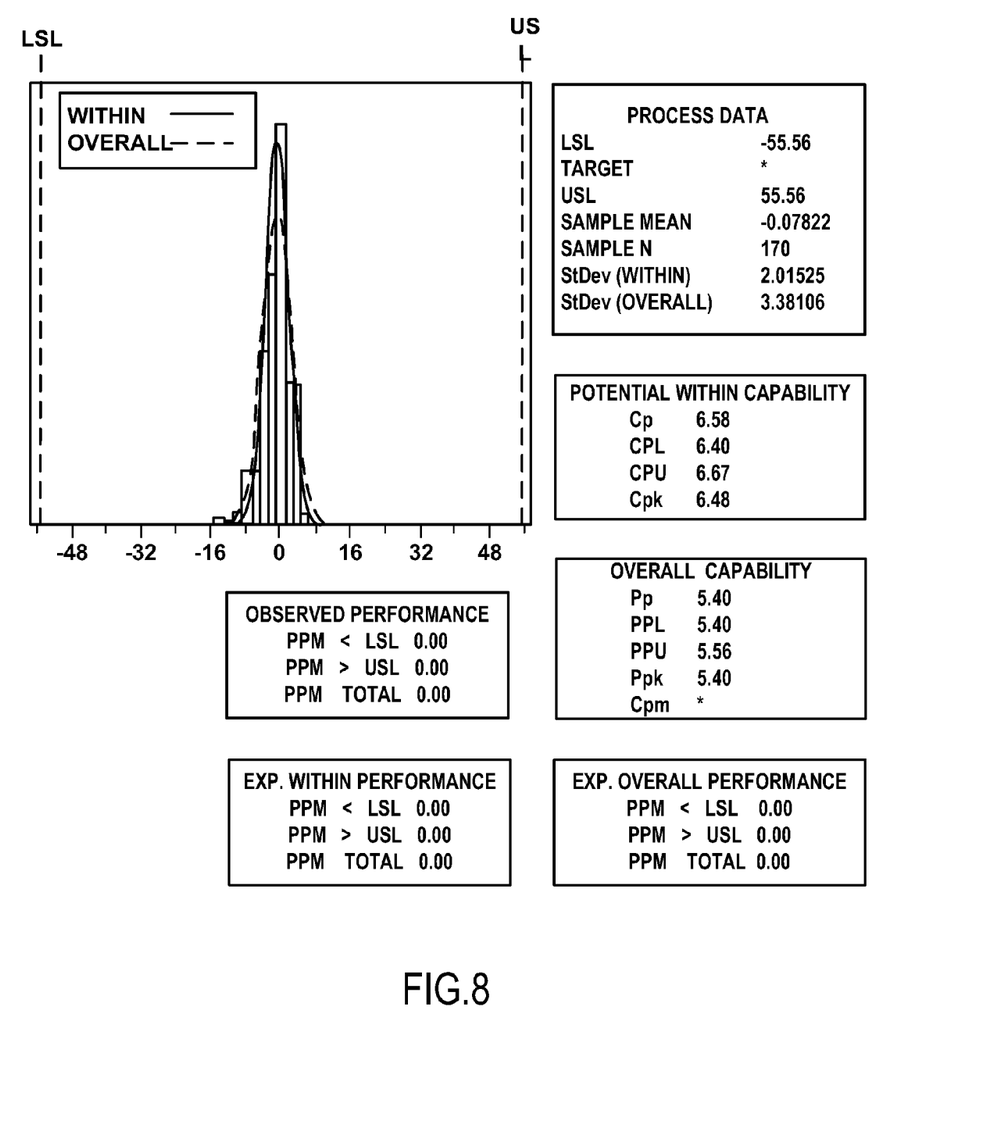
FIG. 8 shows a capability analysis of SOI prediction error for SOI sweep test using the data shown in FIG. 7.

FIG. 8 shows a capability analysis of SOI prediction error for SOI sweep test on the same data of FIG. 7 using specification limits of +/−0.5 degree crank angle at 1500 RPM (or 55.56 microseconds) for SOI prediction error. A regression equation was used to map the wavelet-based SOI to compare it with the rate-shape based SOI values. Prediction error is defined as the difference between the mapped wavelet SOI and the rate-shape SOI. The Ppk value is 5.4 indicating very good capability for shot-to-shot SOI measurement.

More data was collected to test the validity of this method over different engine operating conditions and capability analysis was performed on all the data. The results are summarized in Table 1. It can be seen that the Ppk value is above 2.5 for all the different sweeps tested. This shows that the wavelet-based SOI detection technique is not only accurate, but also robust across different operating conditions.

TABLE 1

| Condition | # Samples | Ppk |
|---|---|---|
| Rail Pressure Sweep | 350 | 3.01 |
| SOI Sweep | 170 | 5.40 |
| Speed Sweep | 70 | 2.66 |
| Load Sweep | 40 | 3.13 |
| EGR Sweep | 30 | 3.75 |

As can be seen, performing wavelet analysis on cylinder pressure data provides a new technique to measure the actual hydraulic SOI delay on running engines. At a minimum, this information can be used to populate SOI delay tables in the controls software using on-engine data (i.e., not only fuel system rig data). Embodiments utilizing the disclosed technique are readily implementable in test cells (that already have cylinder pressure sensors) for calibration work. Accurate SOI delay information provided by the disclosed method and system should help with low on-time fueling accuracy, and the technique is applicable to any high pressure common rail fuel system.

It is to be recognized that in each of the embodiments, the various actions could be performed by modules, which can be specialized circuits (e.g., discrete logic gates interconnected to perform a specialized function), program instructions, such as program modules, being executed by one or more processors (e.g., a central processing unit (CPU) or microprocessor), or by a combination of both, all of which can be implemented in a hardware and/or software of the ECM and/or other controller or plural controllers. For example, in an embodiment the hydraulic SOI timing wavelet analysis module 20 includes plural modules and is part of the controller 16 (e.g., an ECU/ECM). In another embodiment, the hydraulic SOI timing wavelet analysis module 20 can be implemented as a module separate from, but communicating with the controller 16. In yet another embodiment, the functions performed by the hydraulic SOI timing wavelet analysis module 20 can be distributed across plural modules contained in the controller 16, and/or in plural modules separate from the controller 16. Logic of the modules can be implemented with any type of appropriate hardware and/or software, with portions residing in the form of computer readable storage medium with a control algorithm recorded thereon such as the executable logic and instructions disclosed herein, and can be programmed, for example, to include one or more singular or multi-dimensional engine look-up tables and/or calibration parameters. The computer readable medium can comprise tangible forms of media, for example, a random access memory (RAM), a read-only memory (ROM), an erasable programmable read-only memory (e.g., EPROM, EEPROM, or Flash memory), an optical fiber, and a portable compact disc read-only memory (CD-ROM), or any other solid-state, magnetic, and/or optical disk medium capable of storing information. Logic of the modules disclosed herein can be executed by one or more processors, such as general purpose microprocessors and/or special purpose processors. For example, the logic determining wavelet analysis elements such as approximation and detail coefficients and determining when hydraulic SOI based on the wavelet analysis elements can be performed by a CPU of an ECU/ECM. Thus, various aspects can be embodied in many different forms, and all such forms are contemplated to be consistent with this disclosure.

In an embodiment, the hydraulic SOI timing wavelet analysis module 20 samples and records the cylinder pressure signal from each combustion chamber in-cylinder pressure sensor 8 at a high rate for a brief duration starting at or near electrical (commanded) SOI and ending at or near electrical end-of-injection (EOI). The sampling rate is selected such that it ensures the desired output resolution. The corresponding crank tooth interrupt time stamps are determined from the crankshaft angle sensor 16 and are also recorded and are used to calculate the instantaneous volume matching up with each pressure sample. The sampled pressure data can be filtered to smooth the data.

The method of determining SOI focuses on a wavelet transform of the cylinder pressure sensor signal tailored to bring out a certain band of frequencies corresponding to high frequency pressure pulsations inside the cylinder. These pulsations are excited upon injection due to the high velocity fuel jet from the fuel injector 6. The onset of this phenomenon lines up with the hydraulic SOI event in time as the fuel starts squirting into the combustion chamber. The wavelet transform is processed iteratively on several dyadic (powers of 2) scales until the desired frequency band, which is a function of chamber geometry, is encountered in the detail coefficients of the transform. The number of iterations is fixed for a given engine with specified cylinder geometry. The detail coefficients at the desired level, which were extracted by the transform, are analyzed to locate a sudden rise in signal energy corresponding to the pressure pulsations mentioned above. The hydraulic SOI corresponds to the point where the signal amplitude crosses a suitable threshold, such as a 4-sigma level. The hydraulic SOI timing can be related to a crank angle. Knowing the crankshaft angle of the commanded (electrical) SOI and crankshaft angle at hydraulic SOI, for example, by the crankshaft timestamps at the time of these events, the delay in crankshaft angle can be determined, and the delay time in seconds between commanded SOI and hydraulic SOI can be determined from the crankshaft angular delay and the engine speed (RPM).

The hydraulic SOI for a large number of injection events can be detected as explained above and used in a moving average filter to suppress the effect of measurement errors. The engine system 1 can run this method during normal engine operation (e.g., on production engines equipped with in-cylinder pressure sensors) with a duty-cycle that is frequent enough to capture the SOI drift of the injectors. The effect of SOI drift on combustion phasing can be compensated for by moving the commanded (electrical) SOI in time or angle by an appropriate amount. The effect of the same on low fueling quantities can be compensated for by applying an adaptive correction to the output of a predetermined fueling relationship, for example, from an output of a fueling-to-ontime (FON) mapping/table. Thus, the system and method disclosed herein can help prevent fuel system variations from affecting the engine system 1.

The technique of determining hydraulic SOI disclosed herein provides a way to detect hydraulic SOI on production engines equipped with in-cylinder pressure sensors without using expensive needle lift instrumented injectors. This method takes a novel approach in that it decouples the hydraulic SOI point from the SOC point (which is well established in heat release analysis), thereby providing a means to compensate at the fuel subsystem level as opposed to compensating at the engine system level.

This technique provides feedback on hydraulic SOI delay which is an indicator of both injector performance and health. Small drifts in hydraulic delay can be compensated for with a change in commanded SOI, and the nominal fuel system response/behavior can be maintained through the life of the injector. The same technique can also reduce the effect of injector-to-injector variations on the engine system, and can be utilized early in the life of the engine system 1 (e.g., from the beginning). The system and method also can allow for using detected abnormal or excessive drifts in the hydraulic delay to detect and/or flag injector hardware problems before they fail completely.

Hydraulic SOI delay can significant affect fueling accuracy, most particularly at low fueling levels. The disclosed system and method can therefore be used as a compensation technique and mechanism for identifying and addressing fueling drifts in the low-fueling region. For example, the output of a FON mapping function/table can be adapted to accommodate for the direction and magnitude of SOI delay shift. This is also applicable to reducing injector-to-injector fueling variations by maintaining injector specific trims/corrections that evolve with engine time.

The different feedback/compensation methods described above also can contribute to the potential elimination of the end-of-line (EOL) bar-coding of injectors as the injector-to-injector variations are detected and compensated during normal engine operation in an adaptive fashion. From a systems engineering view point, the ability to decouple SOI from SOC makes it possible to compensate for fuel system variations at the subsystem level as opposed to at the engine level which minimizes the effects of interactions.

The hydraulic SOI for a large number of injection events can be detected, as explained above, and can be used in a moving average filter to suppress the effect of measurement errors. In an embodiment, a moving average can be run during normal engine operation on engines equipped with in-cylinder pressure sensors with a duty-cycle that is frequent enough to capture the SOI drift of the injectors. Small drifts in hydraulic delay can be compensated for with a change in commanded electrical SOI (commanded SOD, and the nominal fuel system response/behavior can be maintained through the life of the injector. The same technique can also reduce the effect of injector-to-injector variations on the engine system, from the time of production and at any point during the life of the engine system. Abnormal or excessive drifts in the hydraulic delay can be used to detect/flag injector hardware problems before they fail completely. The hydraulic SOI delay affects fueling accuracy, and prominently so at low fueling levels. Embodiments according to the present disclosure can therefore be used to compensate for fueling drifts in the low-fueling region, for example, by adapting or adjusting the output of the Fueling-to-online (FON) mapping function/table to accommodate for the direction and magnitude of SOI delay shift. This also can be applicable to reducing injector-to-injector fueling variations by maintaining injector specific trims/corrections that evolve with engine time.

The different feedback/compensation methods mentioned above also contribute to the potential elimination of EOL bar-coding of injectors as the injector-to-injector variations are detected and compensated during normal engine operation in an adaptive fashion. From a systems engineering view point, the ability to decouple SOI from SOC makes it possible to compensate for fuel system variations at the subsystem level as opposed to at the engine level which can minimize the effects of interactions.

Further, while embodiments described above utilize either a DWT or an SWT to determine frequency bands of pressure pulsations excited from a fuel jet injected into the cylinder during a time period including electrical SOI and electrical end of injection for a single SOI event, it is to be understood that embodiments consistent with the present disclosure can instead utilize CWT as a filtering technique to extract the relevant frequency band out of the sampled CPS signal. For example, stretching a wavelet in time (increased scale parameter s) causes the wavelet's support in the frequency domain to shrink. In addition to shrinking the frequency support, the center frequency of the wavelet shifts toward lower frequencies. The CWT can therefore bandpass filter the input CPS signal. CWT coefficients at lower scales represent energy in the input signal at higher frequencies, while CWT coefficients at higher scales represent energy in the input signal at lower frequencies. However, unlike Fourier bandpass filtering, the width of the bandpass filter in the CWT is inversely proportional to scale.

In an embodiment, the choice of a particular scale over another one can be determined as follows: 1) perform the full CWT for all possible scales for a broad range of cylinder pressure data; and 2) analyze the two dimensional data to identify the scale that results in the best signal-to-noise ratio in a repeatable/robust manner across all operating conditions. This should allow the choice of a scale for a specific wavelet. For the choice of the wavelet, the same strategy applied in the case of SWT embodiment can be used for CWT. For example, wavelets that allow zero phase shifts can be used to preserve time alignment of wavelet coefficients. Symlets and Coiflets are good wavelet candidates for this type of application' although other wavelet families can be utilized. Additionally, by selecting the shortest width wavelet that meets the performance criteria, computational burden and boundary distortion effects can be kept to a minimum.

Although a limited number of embodiments is described herein, one of ordinary skill in the art will readily recognize that there could be variations to any of these embodiments and those variations would be within the scope of the disclosure.

What is claimed is:

1. A method of detecting hydraulic start-of-injection (SOI) timing of a fuel injector following a commanded SOI for each fuel injector fluidly connected to a cylinder of an internal combustion engine, comprising:
sampling a pressure in a combustion chamber of the cylinder of the internal combustion engine over a time period including an electrical SOI and an electrical end of injection for a single SOI event to obtain a signal based on the sampled pressure;
using a processor, calculating a wavelet transform of the signal based on the sampled pressure to determine a frequency band of pressure pulsations excited from a fuel jet injected into the cylinder during the time period; and
determining a time of hydraulic SOI timing of the fuel injector as a time when an amplitude value of a wavelet transformed signal corresponding to the frequency band of pressure pulsations satisfies a predetermined threshold value.

2. The method for detecting hydraulic SOI timing of an internal combustion engine of claim 1, wherein the wavelet transform is a discrete wavelet transform.

3. The method for detecting hydraulic SOI timing of an internal combustion engine of claim 1, wherein the wavelet transform is a stationary wavelet transform.

4. The method for detecting hydraulic SOI timing of an internal combustion engine of claim 1, wherein the wavelet transform is a continuous wavelet transform.

5. The method for detecting hydraulic SOI timing of an internal combustion engine of claim 1, wherein the processor calculates a successive number of detail coefficients of a wavelet transform of the signal until reaching a detail coefficient corresponding to a frequency band containing frequencies of pressure pulsations excited from a fuel jet injected into the cylinder during the time period, and
the hydraulic SOI timing of the fuel injector is determined as a time when an amplitude value of successive amplitude values of the detailed coefficient first satisfies a predetermined threshold value.

6. The method for detecting hydraulic SOI timing of an internal combustion engine of claim 1, further comprising:
determining an amount of delay between the determined hydraulic SOI time and a timing of the commanded SOI.

7. The method for detecting hydraulic SOI timing of an internal combustion engine of claim 6, further comprising:
adjusting a timing of the commanded SOI of the injector by an amount corresponding to the delay amount.

8. The method for detecting hydraulic SOI timing of an internal combustion engine of claim 7, wherein adjusting the timing of the commanded SOI is performed on a command timing value output from a fueling map or table.

9. The method for detecting hydraulic SOI timing of an internal combustion engine of claim 8, wherein the internal combustion engine includes plural cylinders and respective fuel injectors, and the method further comprises:
monitoring the delay amounts to detect a drift in delay amounts satisfying a predetermined drift threshold value; and
for each fuel injector for which a detected delay amount drift exceeds the predetermined drift threshold value, adjusting a timing of commanded SOI for that fuel injector to compensate for the detected drift amount.

10. The method for detecting hydraulic SOI timing of an internal combustion engine of claim 9, further comprising:
moving average filtering the determined delay amounts for each fuel injector, wherein said monitoring is performed on said filtered determined delay amounts.

11. The method for detecting hydraulic SOI timing of an internal combustion engine of claim 1, further comprising:
smooth filtering the sampled pressure signal data prior to calculating a successive number of detail coefficients.

12. The method for detecting hydraulic SOI timing of an internal combustion engine of claim 1, further comprising:
band-pass filtering the sampled pressure signal data prior to calculating a successive number of detail coefficients using an analog filter or a digital filter.

13. The method for detecting hydraulic SOI timing of an internal combustion engine of claim 6, further comprising:
comparing said delay with a threshold value; and
generating a fault indication if said delay exceeds said threshold.

14. An engine system, comprising:
an internal combustion engine including:
an engine block including a plurality of cylinders and respective pistons;
a cylinder head covering the cylinders to define a combustion chamber between the top of the piston and a surface of the cylinder head, each said combustion chamber fluidly connected to a fuel injector configured to inject fuel into the combustion chamber in a timed manner;
a pressure sensor configured to sense a pressure in each combustion chamber and generate a signal indicative of the sensed pressure in the combustion chamber;
a crankshaft coupled to each piston and configured to cause each piston to move in a reciprocal motion by angular rotation thereof; and
a controller including:
a pressure determining module configured to receive and sample the signal indicative of pressure in each said combustion chamber as a function of crankshaft angle;
a wavelet transform determining module configured to calculate, for each cylinder, a wavelet transform of the sampled pressure signal to determine a frequency band containing frequencies of pressure pulsations excited from a fuel jet injected into the cylinder; and
a comparing module configured to compare amplitudes of the wavelet transform of the sampled pressure signal in the frequency band with a predetermined threshold value and determine a hydraulic SOI timing of the fuel injector as corresponding to the crankshaft timing when the amplitude value first satisfies the threshold value.

15. The engine system of claim 14, wherein the wavelet coefficient determining module utilizes a discrete wavelet transform to calculate a successive number of detail coefficients of a wavelet transform of the sampled pressure signal.

16. The engine system of claim 14, wherein the wavelet coefficient determining module utilizes a stationary wavelet transform to calculate a successive number of detail coefficients of a wavelet transform of the sampled pressure signal.

17. The engine system of claim 14, wherein the wavelet coefficient determining module utilizes a continuous wavelet transform to calculate the wavelet transform of the sampled pressure signal at predetermined scales.

18. The engine system of claim 14, wherein the wavelet transform determining module is configured to calculate, for each cylinder, a successive number of detail coefficients of a wavelet transform of the sampled pressure signal until reaching a detail coefficient corresponding to a frequency band containing frequencies of pressure pulsations excited from a fuel jet injected into the cylinder, and
the comparing module is configured to compare successive amplitudes of the calculated detail coefficient corresponding to a frequency band containing frequencies of the excited pressure pulsations with a predetermined threshold value and determine the hydraulic SOI timing of the fuel injector as the crankshaft timing when the amplitude value first satisfies the threshold value.

19. The engine system of claim 14, wherein the wavelet transform determining module is configured to calculate, for each cylinder, the wavelet transform at a continuous wavelet transform scale corresponding to a frequency band containing frequencies of pressure pulsations excited from a fuel jet injected into the cylinder, and
the comparing module is configured to compare successive amplitudes of the calculated continuous wavelet transform corresponding to a frequency band containing frequencies of the excited pressure pulsations with a predetermined threshold value and determine the hydraulic SOI timing of the fuel injector as the crankshaft timing when the amplitude value first satisfies the threshold value.

20. The engine system of claim 14, wherein the controller further comprises:
a delay determining module configured to determine, for each fuel injector, an amount of delay between the determined hydraulic SOI timing and a timing of a commanded SOI.

21. The engine system of claim 20, further comprising:
a fault indication module configured to compare said delay with a threshold value; and generate a fault indication if said delay exceeds said threshold.

22. The engine system of claim 20, wherein the controller further comprises:
a delay monitoring module configured to monitor the delay amounts determined by the delay determining module to detect drift in delay amounts satisfying a predetermined threshold; and
a delay adjustment module configured to adjust a timing of commanded SOI for each fuel injector corresponding to a detected drift in delay amount to compensate for the detected drift amount.

23. The engine system of claim 20, further comprising:
a timing adjusting module for adjusting a timing of the commanded SOI of the injector by an amount corresponding to the delay amount.

24. The engine system of claim 23, wherein the timing adjusting module is configured to adjusting the timing of the commanded SOI using a command timing value output from a fueling map or table.

25. The engine system of claim 22, further comprising:
a filter module configured to moving average filter the determined delay amounts for each fuel injector, wherein said monitoring is performed on said filtered determined delay amounts.

26. The engine system of claim 14, further comprising:
a filter module configured to smooth filter the signal indicative of the sensed pressure.

27. The engine system of claim 14, further comprising:
a filter module configured to bandpass filter the signal indicative of the sensed pressure.

* * * * *